United States Patent [19]

Miyazaki

[11] Patent Number: 4,533,238

[45] Date of Patent: Aug. 6, 1985

[54] EXPOSURE DETECTING DEVICE FOR COPYING MACHINE

[75] Inventor: Seikichi Miyazaki, Kanagawa, Japan

[73] Assignee: Fuji Xerox Co., Ltd., Tokyo, Japan

[21] Appl. No.: 516,493

[22] Filed: Jul. 25, 1983

[30] Foreign Application Priority Data

Jul. 23, 1982 [JP] Japan .................. 57-128511

[51] Int. Cl.³ .............................. G03B 27/74
[52] U.S. Cl. ...................... 355/68; 355/14 E
[58] Field of Search .................. 355/14 E, 68, 69

[56] References Cited

U.S. PATENT DOCUMENTS 4,117,375  9/1978  Bachur et al. ............... 355/69 X
4,433,906  2/1984  Nakatani et al. ............. 355/69 X Primary Examiner—Richard A. Wintercorn
Attorney, Agent, or Firm—Sughrue, Mion, Zinn, Macpeak and Seas

[57] ABSTRACT

An exposure detecting device for a copying machine having an optical system which produces an image of an original on a photosensitive drum using an image forming lens and at least one mirror. At least one mirror in the optical system is implemented with a multilayer film interference filter which transmits light rays in a spectral range in which said photosensitive body is not sensitive and reflects light rays in other ranges. A photosensor is arranged on the rear surface of the multilayer film interference filter. The output of the photosensor is applied to control the intensity of a light source used for forming the image of the original on the photosensitive drum.

8 Claims, 4 Drawing Figures

EXPOSURE DETECTING DEVICE FOR COPYING MACHINE

BACKGROUND OF THE INVENTION

The present invention relates to a device for detecting an amount of exposure in a copying machine.

In prior art copying machines, the optical system for exposure, namely, the lenses, mirrors and lamps, tend to gradually become contaminated by the collection of toner powder and other dust in the machine. As a result, the amount of exposure may be insufficient or the copy foggy; that is, the resultant copy may be unsatisfactory in quality.

In order to solve the above-described problem, a device has been proposed in the art in which a reference reflection surface is provided near the platen and the amount of light reflected from the reference reflection surface is detected to correct the amount of exposure of the lamp. Such a device is shown in FIG. 1.

As shown in FIG. 1, a reference reflection surface 2 is provided at a predetermined position on a platen 1 and is illuminated by a lamp 3 during exposure. Light reflected from the surface 2 is applied to a photosensitive drum 7 by means of a mirror 4, an image forming lens and a mirror 6. A light receiving sensor 9 is disposed near the photosensitive drum 7 and is mounted in such a manner that it can be disposed either in or out of the optical path by operation of a driving device such as a solenoid 8. The light receiving sensor 9 detects the amount of light received from the reference reflection surface 2, from which the amount of light emitted by the exposure lamp 3 can be corrected.

The above-described conventional approach is disadvantageous in that, as the provision of a driving mechanism is required in order to cause the light receiving sensor to move in and out of the optical path, the manufacturing cost of the copying machine is high due to the need for such a mechanism. Further, if the light receiving sensor itself becomes contaminated, it is difficult to accurately detect the state of the optical system in the copying machine.

Accordingly, an object of the invention is to provide an exposure detecting device for a copying machine in which no such driving mechanism need be provided, and the above-described difficulty related to the contamination of the light receiving sensor is eliminated.

SUMMARY OF THE INVENTION

The foregoing object of the invention has been achieved by the provision of an exposure detecting device for a copying machine having an optical system for exposure including an image forming lens for forming the optical image of an original on a photosensitive body, further including according to the invention, a multilayer film interference filter which forms a part of the optical system and which transmits light rays in a spectral range in which the photosensitive body is not sensitive and reflects light rays in other ranges, and a light receiving sensor arranged on the rear surface of the multilayer film interference filter.

DESCRIPTION OF THE PREFERRED EMBODIMENT

Figure 1:
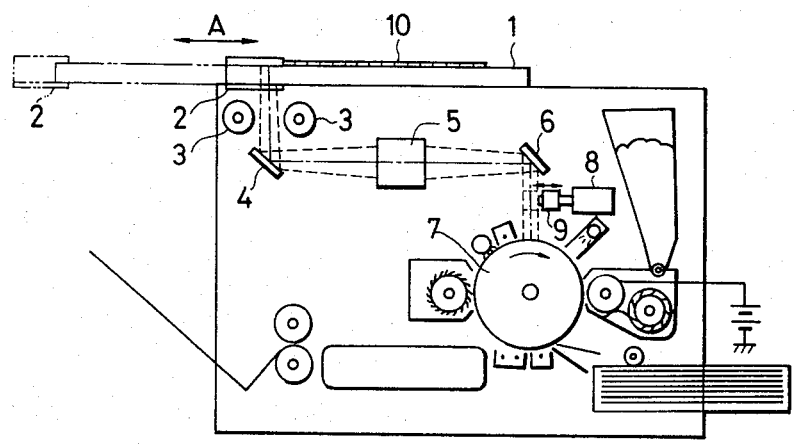
FIG. 1 is an explanatory diagram showing the arrangement of a copying machine with a conventional exposure detecting device.

The invention will be described with reference to the accompanying drawings. FIG. 2 is an explanatory diagram of a preferred embodiment of an exposure detecting device according to the invention. Similar to the case of FIG. 1, a platen 1 is moved in the direction of the arrow A (in FIG. 1) to scan an original 10 placed on the platen 1. Furthermore, as in the case of FIG. 1, exposure lamps 3 illuminate the original. An image of the original is accordingly formed on a photosensitive drum 7. Also, a reference reflection surface 2 is provided at a predetermined position on the platen 1.

Figure 2:
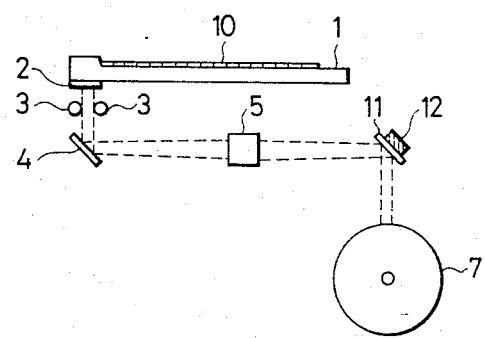
FIG. 2 is an explanatory diagram showing the arrangement of an exposure detecting device according to a preferred embodiment of the invention.

In the device of the invention, a mirror 4 and an image forming lens 5 are disposed in positions the same as those in the exposure optical system in FIG. 1. However, the mirror 6 (FIG. 1) is replaced by a multilayer film interference filter 11, which may be a so-called "dichroic mirror".

The multilayer film interference filter employed in the invention has a predetermined characteristic related to the spectral sensitivity of the material of the photosensitive drum. Specifically, the characteristic of the filter 11 is such that light in a spectral range to which the photosensitive drum is not sensitive is transmitted, and light in other ranges, especially in spectral ranges in which the photosensitive drum is sensitive, is reflected.

Figure 3:
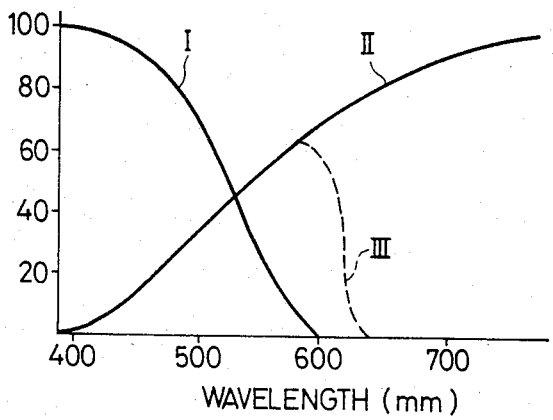
FIG. 3 is a graphical representation indicating the relative spectral sensitivity of a photosensitive body and the relative spectral energy of an exposure lamp.

FIG. 3 shows the relationship between the characteristic curve I of the spectral sensitivity of a selenium photosensitive body (drum) and the characteristic curve II of the spectral energy of a typical copier illuminating lamp, here a halogen lamp. Furthermore, the characteristic curve III indicates that, with the multilayer film interference filter 11 arranged as described above, the optical energy of the lamp which is reflected towards the photosensitive drum 7 at wavelengths for which the photosensitive body is not sensitive passes through the filter. In the case of FIG. 3, light rays having a wavelength above 600 nm pass through the multilayer film interference filter 11. It should further be noted that there is no interference with the normal exposure due to the filter 11 because the photosensitive drum 7 is not sensitive to the light rays in that range.

Further in accordance with the invention, a light receiving sensor 12 is provided on the rear surface of the filter 11 for detecting light which passes through the filter 11. The sensor 12 may be bonded to the rear surface of the filter 11 with a cyanoacrylate adhesive or other adhesives suitable for optical uses, or it may be arranged with a light shielding member which closely seals the rear surface of the filter 11. If the sensor 12 is arranged as described, it will never be affected by contaminated air or contaminated by the dust in the machine.

With one of the mirrors of the prior art system replaced by the multilayer film interference filter 11 and with light receiving sensor disposed on the rear surface of the filter as shown in FIG. 2, light rays which are reflected from the reference reflection surface 2 (which is illuminated by the lamps 3) and applied through the mirror 4 and the lens 5 to the filter 11 reach the photosensitive drum 7 without attenuation in the photosensitive region of the drum. On the other hand, light rays in the spectral region in which the photosensitive drum 7 is not sensitive pass through the filter 11 to the light receiving sensor 12, which produces an electrical signal representative of the optical intensity of such light rays.

Figure 4:
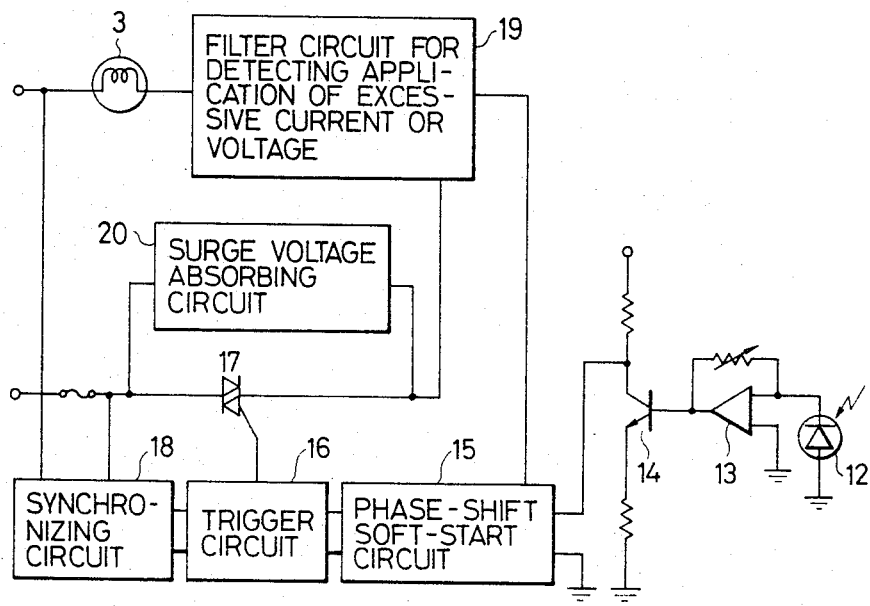
FIG. 4 is a circuit diagram showing a circuit which may be used for controlling the intensity of an exposure lamp.

FIG. 4 is a circuit diagram showing a device for controlling the intensity of an exposure lamp 3 according to the quantity of light detected. In this circuit, the output signal from the light receiving sensor 12, which may be implemented with a photodiode or the like, is amplified by an amplifier 13 and then applied to a driver 14. The driver 14 drives a phaseshift soft-start circuit 15 causing it to generate a trigger pulse, which is applied to a trigger circuit 16 with a relative timing corresponding to a quantity of light detected. Thus, a thyristor 17 is controlled to in turn control the quantity of light emitted by the exposure lamp 3. The circuit of FIG. 4 includes a synchronizing circuit 18 for turning on the lamp 3 in synchronization with scanning and a filter circuit 19 for detecting application of excessive current or voltage to the lamp 3. Furthermore, it is desirable to provide a surge voltage absorbing circuit 20 for the thyristor 17.

According to the invention, a multilayer film filter which reflects light rays in the spectral range in which the photosensitive drum is sensitive and transmits light rays in spectral ranges in which the photosensitive drum is not sensitive is employed as a mirror in the image forming optical path of the copier system. With such an arrangement, although the light receiving sensor is fixedly set in the optical path, the ordinary copying operation is not adversely affected thereby. Accordingly, it is not necessary to provide a drive member for moving the light receiving sensor. Since the light receiving sensor is mounted on the rear surface of the multilayer film interference filter, the light receiving sensor itself will never be contaminated. Furthermore, as the filter forms a part of the copying optical system, specifically, it performs the function of a mirror, the true quantity of light in the optical system available for exposure, and hence the degree of contamination of the optical system, can be detected correctly at all times. Thus, the device of the invention, unlike the conventional device, is free from the drawback that the quantity of light can be detected incorrectly.

In a copying system in which a plurality of mirrors are provided (as shown in FIG. 1 and 2), any one of the mirrors may be replaced by the multilayer film filter. However, it is preferable that the mirror which is closest to the photosensitive drum be replaced by the filter so that the degree of contamination of the entire exposure system can be detected.

While the invention has been described with reference to a copying machine of the type in which the platen is moved, the device of the invention is equally applicable to a copying machine of the type in which the optical system such as a mirror is movable, or a copying machine of the type in which both the platen and the optical are stationary. In the abovedescribed example, the reference reflection surface is provided on the platen. However, the technical concept of the invention is applicable to the case where the reflection surface is not provided. Furthermore, halogen lamps are employed as exposure lamps in the example. However, fluorescent lamps or other lamps may be used as well.

I claim:

1. A copying machine comprising: a light source for illuminating an original; an optical system for providing an image of the illuminated original on a photosensitive body, said optical system comprises:

a multilayer film interference filter which transmits light rays in one spectral range in which said photosensitive body is not sensitive and reflects light rays in all other ranges to said photosensitive body without attenuation;

a photosensor arranged on a rear surface of said multilayer film interference filter responsive to light rays in said one spectral range; and control circuit means for varying an intensity of said light source in accordance with an output of said photosensor.

2. The copying machine of claim 1, wherein said multilayer film interference filter is a dichroic mirror.

3. The copying machine of claim 1, wherein said photosensor is bonded to said rear of said surface of said filter with a cyanoacrylate adhesive.

4. The copying machine of claim 1, further comprising a light shielding member for sealing said rear surface of said filter around said photosensor.

5. The copying machine of claim 1, wherein said optical system comprises a plurality of mirrors, one of said mirrors being implemented with said multilayer film interference filter, said multilayer film interference filter being disposed as a mirror in an optical path between an original and said photosensitive body closest to said photosensitive body.

6. The copying machine of claim 1 wherein said control circuit means comprises a driver circuit responsive to the output of said photosensor, a synchronization circuit for actuating said light source in correspondence with a scanning operation of said copying machine and means to detect an overload condition on said light source.

7. The copying machine of claim 6 wherein said control circuit further comprises means to control the quantity of light emitted by said light source and a surge control circuit in parallel with said means to control.

8. The copying machine of claim 7 wherein said driver circuit comprises an amplifier for amplifying the output of said photoreceptor, a trigger pulse circuit responsive to the output of said amplifier and a trigger circuit responsive to said synchronization circuit for producing an output to said means to control the quantity of light.

* * * * *